United States Patent
Lightowler

(10) Patent No.: US 10,937,339 B2
(45) Date of Patent: Mar. 2, 2021

(54) DIGITAL CRYPTOSYSTEM WITH RE-DERIVABLE HYBRID KEYS

(71) Applicant: Bank of America Corporation, Charlotte, NC (US)

(72) Inventor: Ben Lightowler, Sandhurst (GB)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 16/244,214

(22) Filed: Jan. 10, 2019

(65) Prior Publication Data
US 2020/0226952 A1 Jul. 16, 2020

(51) Int. Cl.
*G09C 1/00* (2006.01)
*H04L 9/06* (2006.01)
*H04L 9/08* (2006.01)
*H04L 9/32* (2006.01)

(52) U.S. Cl.
CPC .............. *G09C 1/00* (2013.01); *H04L 9/0643* (2013.01); *H04L 9/0861* (2013.01); *H04L 9/085* (2013.01); *H04L 9/0869* (2013.01); *H04L 9/0877* (2013.01); *H04L 9/0894* (2013.01)

(58) Field of Classification Search
CPC ........... G09C 1/00; H04L 9/0643; H04L 9/06; H04L 9/08; H04L 9/085; H04L 9/0869; H04L 9/0877; H04L 9/0894; H04L 9/0861; H04L 9/0891; H04L 9/0838; H04L 9/3226; H04L 9/12; G06F 21/602; H04W 12/009
USPC .......... 380/28, 210, 262, 283; 713/167, 161, 713/162, 168
See application file for complete search history.

(56) References Cited

U.S. PATENT DOCUMENTS

| | | | | |
|---|---|---|---|---|
| 5,438,622 A * | 8/1995 | Normile | ................... | H04L 9/12 331/78 |
| 5,444,781 A * | 8/1995 | Lynn | ......................... | H04L 9/12 380/262 |
| 8,526,603 B2 | 9/2013 | Kerschbaum | | |
| 8,837,741 B2 * | 9/2014 | Hawkes | .......... | H04W 12/04071 380/283 |
| 9,407,437 B1 * | 8/2016 | Campagna | ............ | H04L 9/0637 |
| 9,413,531 B2 | 8/2016 | Takashima et al. | | |
| 10,102,065 B1 | 10/2018 | Franklin | | |
| 10,103,885 B2 | 10/2018 | Davis | | |
| 10,169,587 B1 * | 1/2019 | Nix | ........................ | H04L 9/0838 |
| 10,630,466 B1 * | 4/2020 | Wilbur | .................. | H04L 9/0838 |

(Continued)

FOREIGN PATENT DOCUMENTS

EP 3291482 A1 * 3/2018 ............... H04L 9/08

OTHER PUBLICATIONS

Ephemeral Diffie-Hellman with RSA (DHE-RSA) by Prof. Bill Buchanan; pp. 6; Dated: Aug. 31, 2018.*

(Continued)

*Primary Examiner* — Samson B Lemma
*Assistant Examiner* — Ali H. Cheema
(74) *Attorney, Agent, or Firm* — Weiss & Arons LLP; Michael A. Springs, Esq.

(57) ABSTRACT

Systems and methods for encrypting a dataset are provided. The methods may include deriving an ephemeral key, and encrypting the dataset using the ephemeral key to produce a ciphertext. The ephemeral key, without being saved after the encrypting, may be re-derivable on demand and operable to decrypt the ciphertext.

13 Claims, 7 Drawing Sheets

(56) References Cited

U.S. PATENT DOCUMENTS

| | | | | |
|---|---|---|---|---|
| 2004/0003246 | A1* | 1/2004 | Hopkins | H04L 9/0637 713/168 |
| 2004/0083362 | A1* | 4/2004 | Park | H04L 63/0457 713/162 |
| 2011/0138173 | A1* | 6/2011 | Okuda | H01L 9/0891 713/161 |
| 2012/0221854 | A1* | 8/2012 | Orsini | H04L 9/3226 713/167 |
| 2015/0256898 | A1* | 9/2015 | Morton | H04L 9/0841 380/210 |
| 2017/0085540 | A1* | 3/2017 | Avanzi | H04L 9/0877 |
| 2018/0034634 | A1 | 2/2018 | Benarroch Guenun et al. | |
| 2018/0048463 | A1 | 2/2018 | Benarroch Guenun et al. | |
| 2018/0069699 | A1* | 3/2018 | Bowman | H04L 9/0841 |
| 2018/0075262 | A1* | 3/2018 | Auh | G06F 21/602 |
| 2018/0097638 | A1 | 4/2018 | Haldenby et al. | |
| 2018/0115416 | A1 | 4/2018 | Diehl | |
| 2018/0176013 | A1 | 6/2018 | Cheng et al. | |
| 2018/0241561 | A1* | 8/2018 | Albertson | H04L 9/0891 |
| 2019/0098493 | A1* | 3/2019 | Li | H04W 12/009 |
| 2019/0340251 | A1* | 11/2019 | Peddada | G06F 21/602 |

OTHER PUBLICATIONS

Analysis and Improvement of a Strongly Secure Certificateless Key Exchange Protocol without Pairing by Min Zhang, Hua Zhang and Jie Zhang (2012 International Conference on Systems and Informatics (ICSAI 2012)) pp. 5; Dated: (Year: 2012).*

Extended Password Key Exchange Protocols Immune to Dictionary Attack by David P. Jablon (Integrity Sciences, Inc.) pp. 8; Dated: (Year: 1997).*

"Advanced Encryption Standard (AES)," https://nylpubs.nist.gov/nistpubs/fips/nist.fips.197.pdf, Nov. 26, 2001.

Dworkin, Morris, "Recommendation for Block Cipher Modes of Operation: Methods and Techniques," https://nylpubs.nist.gov/nistpubs/Legacy/SP/nistspecialpublication800-38a.pdf, National Institute of Standards and Technology, Dec. 2001.

Dworkin, Morris, "Recommendation for Block Cipher Modes of Operation: The CCM Mode for Authentication and Confidentiality," https://nylpubs.nist.gov/nistpubs/legacy/sp/nistspecialpublication800-38c.pdf, National Institute of Standards and Technology, May 2004.

Dworkin, Morris, "Recommendation for Block Cipher Modes of Operation: The CMAC Mode for Authentication," https://nylpubs.nist.gov/nistpubs/specialpublications/nist.sp.800-38b.pdf, National Institute of Standards and Technology, May 2005.

Dworkin, Morris, "Recommendation for Block Cipher Modes of Operation: Galois/Counter Mode (GCM) and GMAC" https://nylpubs.nist.gov/nistpubs/Legacy/SP/nistspecialpublication800-38d.pdf, National Institute of Standards and Technology, Nov. 2007.

"The Keyed-Hash Message Authentication Code (HMAC)," https://nylpubs.nist.gov/nistpubs/FIPS/NIST.FIPS.198-1.pdf, Information Technology Laboratory National Institute of Standards and Technology, Jul. 2008.

Dworkin, Morris, "Recommendation for Block Cipher Modes of Operation: The XTS-AES Mode for confidentiality on Storage Devices" https://ws680.nist.gov/publication/get_pdf.cfm?pub_id=904691, National Institute of Standards and Technology, Jan. 2010.

"SHA-3 Standard: Permutation-Based Hash and Extendable-Output Functions," https://ws680.nist.gov/publication/get_pdf.cfm?pub_id=919061, Information Technology Laboratory National Institute of Standards and Technology, Aug. 2015.

* cited by examiner

DIGITAL CRYPTOSYSTEM WITH RE-DERIVABLE HYBRID KEYS

FIELD OF TECHNOLOGY

Aspects of the disclosure relate to digital cryptosystems. Specifically, aspects of the disclosure relate to digital key generation, management, and/or operation.

BACKGROUND OF THE DISCLOSURE

There is a strong need in digital environments to keep data secure. One popular family of methods for securing data involves various cryptographic schemes that use digital keys.

A key may include a string of bits that may be used in conjunction with a cryptographic function. The key may be used to encrypt a plaintext dataset and produce an unintelligible ciphertext. In a symmetric key cryptographic scheme, the same key (or an easily computed derivative) may also be used to decrypt the ciphertext and reproduce the plaintext of the dataset.

Secure and efficient management of digital keys presents a challenge that is critical for the success of any cryptographic scheme. A system wherein a large number of datasets are cryptographically protected faces a particularly difficult challenge. On the one hand, using a single key for all the datasets may diminish the security of the system. On the other hand, generating and storing a unique key for each dataset may be inefficient.

It would be desirable, therefore, to provide systems and methods for secure and efficient digital key generation, management, and operation. In particular, it would be desirable to provide a digital key cryptosystem in which a unique key is used for each dataset, yet the unique keys do not all need to be stored in memory.

SUMMARY OF THE DISCLOSURE

Aspects of the disclosure relate to systems and methods for a digital cryptosystem for securing one or more datasets. A master key may be generated for global use across many datasets. To encrypt each individual dataset, a unique initialization vector ("IV") may be generated for the dataset. The IV may be stretched to produce a stretched IV. An ephemeral key may be derived based on the master key and the stretched IV. The dataset may be encrypted using the IV and the ephemeral key to produce a ciphertext. After the encryption, the ephemeral key may be inaccessible, and the ciphertext may be associated with the IV.

To decrypt the ciphertext, the associated IV may be again stretched to produce the stretched IV, the ephemeral key may be re-derived, and the ciphertext may be decrypted using the IV and the ephemeral key to reproduce the plaintext of the dataset.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
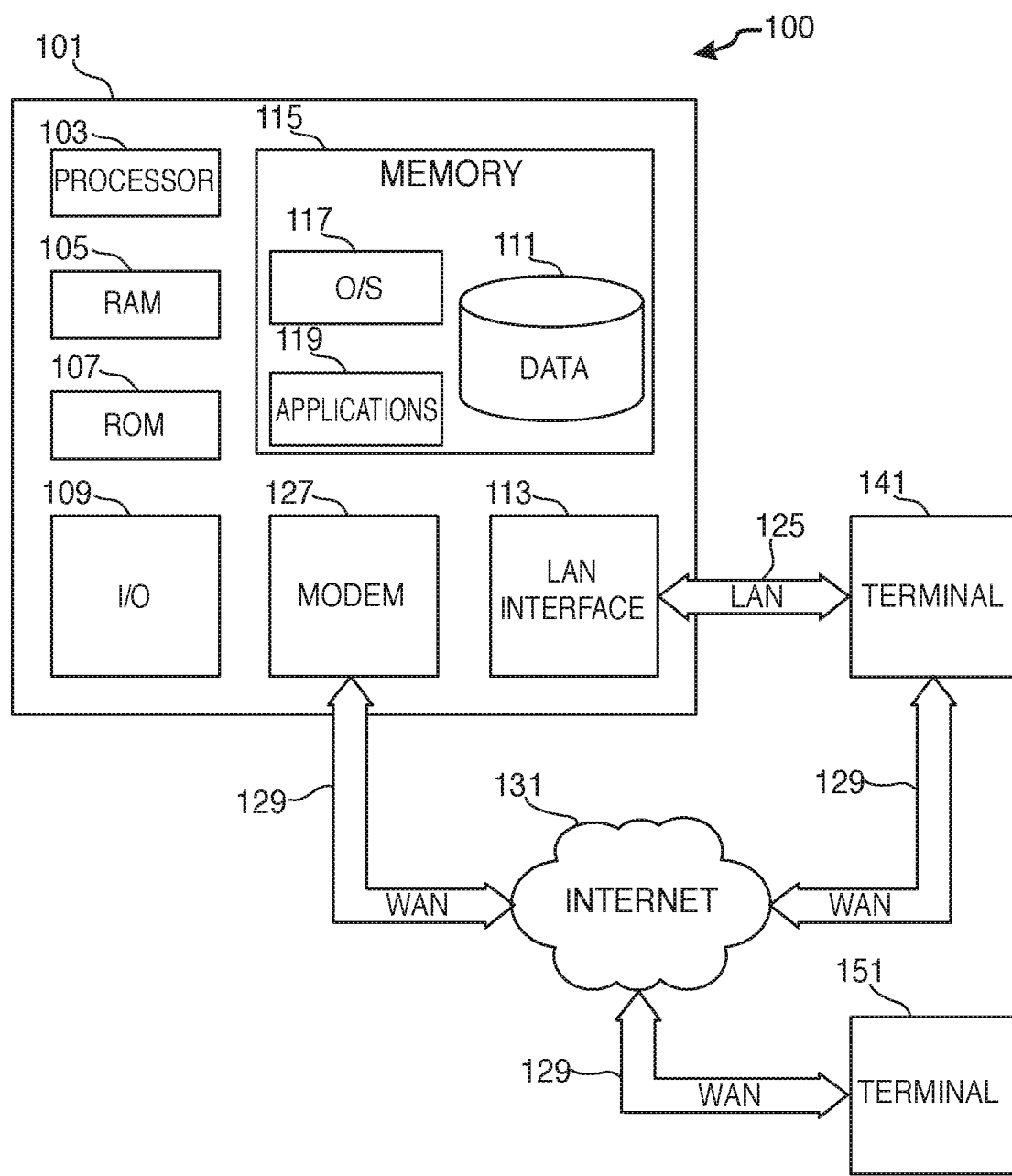
FIG. 1 shows an illustrative system in accordance with principles of the disclosure.

Aspects of the disclosure relate to systems and methods for encrypting a dataset. The encrypting may involve a cryptographic key, e.g., a string of bits of a predetermined length. The key may be used in conjunction with a cryptographic function to encrypt a plaintext dataset and produce an unintelligible ciphertext. Systems and methods according to the disclosure may preferably employ a symmetric key cryptographic scheme, wherein the same key may also be used to decrypt the ciphertext and reproduce the plaintext of the dataset. Other embodiments may use any other suitable cryptographic scheme.

When a symmetric key scheme is used by two parties—e.g., a sender that encrypts data and a receiver that decrypts the data—the key should be available to both parties. The key may be agreed upon in advance, securely transmitted, or otherwise established between the parties. Secure transmission may be achieved via asymmetric (public) key, quantum, or any other suitable cryptographic scheme that may be used for securely transmitting data.

A method for encrypting a dataset is provided. The method may be executed by computer code running on a processor. The method may include deriving an ephemeral key. An ephemeral key may be a cryptographic key that is not saved, or otherwise kept available, after being used for a cryptographic operation. The method may include encrypting the dataset using the ephemeral key to produce a ciphertext. The ephemeral key, without being saved after the encrypting, may be re-derivable on demand and operable to decrypt the ciphertext.

In some embodiments of the method, the dataset may be a member of a set of datasets. For example, an entity may have one or more databases containing many datasets (e.g., files). The datasets may contain sensitive information. The entity may secure the sensitive information according to methods disclosed herein by executing the deriving and encrypting of the method for each of the datasets. The method may include deriving a separate ephemeral key for each of the datasets. The method thereby provides the advantage of a high level of security by encrypting each dataset with a separate key (security improvements may include a reduced impact on the rest of the datasets if one key is compromised), while gaining efficiency by not having to store a large number of keys.

Some embodiments of the method may include generating an initialization vector ("IV"). An IV may be a block of data—e.g., a string of bits—that is generated in some cryptographic systems. Cryptographic systems may generate and employ IV's as part of a mode of operation. A mode of operation may be a process defined to address certain vulnerabilities in some cryptographic schemes. The vulnerabilities are especially pertinent to schemes that use block ciphers—i.e., functions that encrypt and decrypt data of a certain length, known as blocks. Some of the vulnerabilities may relate to the potential ability of a malicious actor to ascertain patterns in the ciphertext—e.g., if a certain portion of plaintext is repeated—and leverage the pattern to break the encryption.

Many modes of operation include generating an IV. The IV may be random and unique to the dataset being encrypted. Some modes of operation include using an exclusive or ("XOR") operation with the IV to mask the dataset. Examples of common modes of operation include Electronic Codebook (ECB), Cipher Block Chaining (CBC), Propagating CBC (PCBC), Cipher Feedback (CFB), Output Feedback (OFB), Counter (CTR), cipher-based message authentication code (CMAC), Counter with Cipher Block Chaining-Message Authentication Code (CCM), Galois/Counter Mode (GCM/GMAC), XOR Encrypt XOR (XEX), and XEX Tweakable Block Cipher with Ciphertext Stealing (XTS-AES).

An IV itself, in general, may sometimes not be encrypted since it may be used in the decryption process as well. As such, the IV may be appended to, transmitted with, or otherwise associated with a ciphertext for use in later decryption. The disclosed method therefore, by design, may build the ephemeral key based at least in part on the IV to leverage the availability of the IV (without any substantial cost to security or efficiency) even after an encryption operation.

Deriving the ephemeral key in the disclosed method may, in certain preferred embodiments, include stretching the IV to produce a stretched IV. Possible reasons for stretching the IV may include the use, in some embodiments, of functions that take inputs of a specific size to derive the ephemeral key, as well as size requirements of the resultant ephemeral keys. A stretched IV of a certain size, as well as the resultant size of the ephemeral key, may provide a desired level of entropy and contribute to a more secure system.

In certain embodiments, stretching the IV may include inputting the IV to an extendable output function ("XOF") and receiving the stretched IV as output. An XOF may be a function that, given an input, generates a consistent output (i.e., a given input always yields the same output) of a predetermined length. The function may be a one-way function (i.e., non-reversible). Using an XOF to stretch the IV may provide a level of entropy (i.e., randomness) that contributes to the security of the system. Other ways of stretching data may rely on insecure and/or reversible methods, such as adding zeroes to a bit string of the data.

The method may include deriving the ephemeral key based on the stretched IV and a master key. The master key may be a global (i.e., useable by other datasets to derive their respective ephemeral keys) cryptographic key that is stored in a secure memory. A secure memory may include any suitable memory location for storing keys. The memory may be commonly accepted as cryptographically secure to those learned in the arts. In some embodiments, more than one master key may exist in a system. The multiple master keys may be the result of multiple versions or updates of the system, or any other condition for associating different sets of datasets with different master keys. Each dataset may be associated with a certain master key via an identifier, or any other suitable means of association.

Deriving the ephemeral key may include inputting the stretched IV and the master key to a function and receiving the ephemeral key as output. The function may preferably be a cryptographically secure keyed hash function—i.e., a function that produces an output that depends both on input data and a key. When cryptographically secure, the keyed hash function may be irreversible for both the input data and the key, as well as providing no known way to find the correct output for any input under a particular key, without knowledge of the key.

Encrypting the dataset may include using the dataset, the IV, and the ephemeral key to produce the ciphertext. Encrypting the dataset may, in certain preferred embodiments, include inputting the IV, the dataset, and the ephemeral key to a cryptographic function to produce the ciphertext. The cryptographic function may be a part of any suitable encryption scheme, such as a symmetric key encryption scheme in conjunction with a suitable mode of operation. The encryption scheme may include the use of digital signatures.

Some embodiments of the systems and methods of the disclosure may include certain cryptographic tools to implement parts of various steps. The tools may include libraries, functions, and/or algorithms. Exemplary tools may include the OpenSSL toolkit and the libcrypto library. Other exemplary tools may include libssl, MatrixSSL, OpenPGP SDK, PolarSSL, BouncyCastle, and Mcrypt, to name but a few. Other embodiments may employ any other suitable tools. The tools may comply with cryptographic standards and specifications.

For example, in some embodiments, the XOF may comply with the Secure Hash Algorithm-3 ("SHA-3") standard specified in Federal Information Processing Standards Publication 202 ("FIPS PUB 202"), the contents of which are incorporated herein by reference. The XOF may, in a preferred embodiment, be "SHAKE256." Some other embodiments may employ any other suitable XOF, or any other suitable algorithm for stretching data.

In another example, the keyed hash function may comply with the Keyed-Hash Message Authentication Code ("HMAC") standard specified in Federal Information Processing Standards Publication 198-1 ("FIPS PUB 198-1"), the contents of which are incorporated herein by reference. Some other embodiments may employ any other suitable keyed hash function, or any other suitable function or algorithm for deriving an ephemeral key.

In yet another example, the cryptographic function may comply with the Advanced Encryption Standard ("AES") cryptographic standard specified in Federal Information Processing Standards Publication 197 ("FIPS PUB 197"), the contents of which are incorporated herein by reference. Other embodiments may employ any other suitable cryptographic function.

In still another example, inputting the IV to the cryptographic function when encrypting the dataset may include using one of the modes of operation defined by the National Institute of Standards and Technology ("NIST") in the NIST Special Publications 800-38A through 800-38E, the contents of which are incorporated herein by reference. Some other embodiments may employ any other suitable mode of operation, or any other suitable algorithm for encrypting with an IV. Other embodiments may not use the IV in the encryption and/or decryption.

In certain embodiments, the IV may be a string of 96 bits, or, alternatively, 128 bits. The master key may be a string of 256 bits. Stretching the IV may include producing, based on the IV, a string of 256 bits for use as the stretched IV. The number of bits in the IV, the stretched IV, and the master key may depend on the specific cryptographic schemes, modes, and/or tools chosen for implementation (e.g., AES-256).

In some embodiments, the method may further include appending the IV to the ciphertext to create a combined text. The combined text may be stored. The combined text may be transmitted. Transmission of the combined text may be to another party, such as a client. The transmission may be to another server or database. In one example, an entity may use "Off-Board Crypto" to administer a client's secure data via a third-party cryptography provider. The disclosed method may also be useful to provide "crypto-agility"—i.e., a user-friendly cryptographic library with underlying implementation that can be easily changed without affecting the user experience. The use of ephemeral keys may be especially appropriate in such systems.

The ephemeral key may preferably be re-derivable to decrypt the ciphertext. The ephemeral key may be re-derivable even if it is inaccessible or does not exist anymore. To re-derive the ephemeral key, a sub-method may be executed. The sub-method may include extracting the IV from the combined text. Extracting the IV may depend on the process used to associate the IV with the ciphertext. For example, if a 128-bit IV was appended to the beginning of the ciphertext, extracting the IV may include using the first 128 bits of the combined text.

The sub-method may include re-producing the stretched IV by re-stretching the IV. Re-stretching the IV may, in some embodiments, include inputting the IV to the same XOF as the method used in encrypting the dataset.

The sub-method may include re-deriving the ephemeral key based on the stretched IV and the master key. Re-deriving the ephemeral key may, in certain embodiments, include inputting the stretched IV and the master key to the same keyed-hash function used in encrypting the dataset. The ephemeral key may then be used to decrypt the ciphertext.

A hybrid cryptographic system for securing a set of one or more datasets is provided. The system may include computer executable instructions stored in a non-transitory memory that, when run on a processor, are configured to generate a master key. The master key may be for use with all of the datasets.

To encrypt each individual dataset, the system may generate a unique initialization vector ("IV") for the dataset. The system may stretch the IV via an extendable output function ("XOF") to produce a stretched IV. The system may input the stretched IV and the master key to a keyed hash function to derive an ephemeral key for the dataset. The system may encrypt the dataset by inputting the IV, the dataset, and the ephemeral key to a cryptographic function to produce a ciphertext.

In some embodiments, the system may be configured to link the IV with the ciphertext by appending the IV to the ciphertext to create a combined text. The system may store and/or transmit the combined text without the ephemeral key.

Even when the ephemeral key no longer in exists after the encryption, the system may be configured to decrypt the ciphertext. The system may extract the IV and the ciphertext from the combined text, re-produce the stretched IV by inputting the IV to the XOF, re-derive the ephemeral key via the keyed hash function using the stretched IV and the master key, and decrypt the ciphertext by inputting the IV, the ciphertext, and the ephemeral key to the cryptographic function to reproduce the dataset in plaintext.

A method for generating an ephemeral key and using the ephemeral key to secure a dataset is provided. The ephemeral key may be a digital cryptographic key that is derived to encrypt the dataset without being saved, stored, or otherwise configured to be accessible after the encrypting. The ephemeral key may be rederive-able on demand to decrypt the dataset. The method may be executed by computer code running on a processor.

The method may include generating a random initialization vector ("IV"), stretching the IV to produce a stretched IV, deriving the ephemeral key based on the stretched IV and a master key (the master key being a global cryptographic key that is stored in a secure memory and is shared by other datasets), and encrypting the dataset using the IV and the ephemeral key to produce a ciphertext.

To decrypt the ciphertext, the method may include re-stretching the IV to re-produce the stretched IV, re-deriving the ephemeral key based on the re-produced stretched IV and the master key, and decrypting the ciphertext using the IV and the ephemeral key.

In some preferred embodiments of the method, the dataset may be a member of a set of datasets. The method may be executed for each dataset in the set of datasets. The method may include deriving a separate IV, and therefore a separate resultant ephemeral key, for each dataset in the set of datasets.

In certain embodiments of the method, the IV may be stretched to produce a stretched IV. The stretching may include inputting the IV to an extendable output function ("XOF"). The XOF may produce the stretched IV as output. An XOF may be a one-way function that, given an input, generates a consistent output of a predetermined length.

The stretched IV may, in some embodiments, be used with the master key to derive the ephemeral key. The deriving may include inputting the stretched IV and the master key to a keyed hash function. The keyed hash function may produce the ephemeral key as output.

The ephemeral key may, in certain embodiments, be used to encrypt the dataset. The encrypting may also involve the IV. The encrypting may include inputting the IV, the dataset, and the ephemeral key to a cryptographic function. The cryptographic function may produce a ciphertext.

In some embodiments, the method may include appending the IV to the ciphertext to create a combined text. The combined text may be stored and/or transmitted without the ephemeral key. Even when the ephemeral key no longer exists, the decrypting step of the method may be executed to retrieve the plaintext of the dataset.

Systems and methods in accordance with aspects of the disclosure may, in some embodiments, utilize computer executable code, such as the exemplary code snippet shown in Tables A, B, and C. The code contains comments for illustrative and explanatory purposes.

The exemplary snippet presented in Tables A, B, and C may include specific algorithms, logic, steps, toolkits, and libraries for implementing the embodiment. The specific implementations are not meant to limit the scope of the disclosure, rather to illustrate one preferred embodiment. Any other suitable tools, libraries, algorithms, logic, and/or steps may be used to implement the methods and systems disclosed herein.

Table A includes the definition of an exemplary function "crypt_data." The crypt_data function may be the entry-point of the snippet. The crypt_data function may be called with a directive to either encrypt a plaintext or decrypt a ciphertext. Following is a summary of some of the steps the crypt_data function executes when it is called to encrypt and decrypt:

If Encrypt is Called:
An initialization vector ("IV") of 96 bits is generated for the operation. This includes a call to the function "get_random," the definition of which is included in Table B.
The IV and a master key are used to derive an ephemeral key. This includes a call to the function "derive_key," the definition of which is included in Table C. The "derive_key" function includes the following two steps:
i. The IV is transformed via XOF (SHAKE256) into a 256-bit value via the libcrypto library of the OpenSSL toolkit.
ii. The resultant digest is signed with the master key (HMAC256 via PKCS11).
The resultant ephemeral key is used in an AES256GCM encryption operation via libcrypto/OpenSSL. (GCM—Galois/Counter Mode—is a mode of operation defined in NIST Special Publication 800-38D.)
The resultant GCM Tag, key identifier (more than one master key may exist), ciphertext, and IV are returned to the client.

If Decrypt is Called:
The IV, key identifier, and GCM are detached from the ciphertext.
The IV and a master key are used to derive an ephemeral key. This includes a call to the function "derive_key," the definition of which is included in Table C. The "derive_key" function includes the following two steps:
i. The IV is transformed via XOF (SHAKE256) into a 256-bit value via libcrypto/OpenSSL.
ii. The resultant digest is signed with the master key (HMAC256 via PKCS11).
The resultant ephemeral key is used in an AES256GCM decryption operation via libcrypto/OpenSSL alongside the IV and GCM tag.
The resultant plaintext is then returned to the client.

TABLE A

```
# Symmetric Encryption/Decryption via AES256 GCM via libcrypto and ephemeral key derivation.
def crypt_data(self,session_info,input_handle,input_length,is_binary=True,is_encrypt=True):
    # Account information structure helper to more easily access user information (e.g. the key ids).
    ac_info = AccountInfo(session_info['account_id'],session_info)
    # If the input data is a handle from a socket (streamed request), read the input data. If not, the input data is a bytearray.
    try:
        input_data = input_handle.read(input_length)
    except:
        input_data = input_handle
    # If the request was received with a non-native user agent, the input data is base64 encoded which must be decoded.
    # If decoding fails, return an error to the client handler.
    if(is_binary == False):
        try:
            input_data = base64.b64decode(input_data)
            input_length = len(input_data)
        except:
            del ac_info
            return False,CSN_ERR_PARAM,b""
    # Pull our AAD from the configuration profile (located on the service database).
    aad_data = self.appctx.config.get_global_config( )['gcm_aad']
    output_data = b""
    # Encryption operations first require IV generation.
    if(is_encrypt == True):
        # Generate IV via random generation from the HSM partition associated with the user.
        result,status_code,iv_data = self.get_random(session_info,12)
        # If random operation fails, return the associated error code and overall operation result of 'False'.
        if(result == False):
            del ac_info
            return False,status_code,b""
        # Derive Ephemeral Key
        result,status_code,key_data = self.derive_key(session_info['hsm_id'],ac_info.primary_keyring.symmetric_id,ac_info.primary_keyring.symmetric_type,iv_data)
        # If ephemeral key generation fails, the operation fails with a specific status/error code.
        # The code and failure are logged and an error is returned to the client.
        if(result == False):
            del ac_info
            return result, status_code,b""
        # If the ephemeral key was derived properly, encrypt the data using software libcrypto GCM functionality exposed by libcsservernative (libcrypto/openssl wrapper).
        status_code,output data = self.appctx.csn.encrypt_data(input_data,ac_info.primary_keyring.symmetric_id[0:4],key_data,iv_data,aad_data)
```

TABLE A-continued

```
    else:
        # The key_id value assists in the identification of which key is used on a specific ciphertext.
        # The value itself is defined as the first 4 bytes of the stored key id. This value helps the server determine if an older key
        # was used to encrypt the data to ensure the archived key is used to properly decrypt data per policy.
        key_id = input_data[0:4]
        # Temporary structure for key_id matching.
        tkt = {
ac_info.primary_keyring.symmetric_id[0:4]:{'id':ac_info.primary_keyring.symmetric_id,'type':ac_info.primary_keyring.symmetric_type},
ac_info.secondary_keyring.symmetric_id[0:4]:{'id':ac_info.secondary_keyring.symmetric_id,'type':ac_info.secondary_keyring.symmetric_type},
        }
        # If the key_id value was not associated with a stored primary or archived key, we return an error as either the ciphertext is invalid
        # or was encrypted with a key that exceeds the archival timeline.
        if(not key_id in tkt.keys( )):
            del ac_info
            return False,CSN_ERR_PARAM,b""
        iv_data = input_data[4:16]
        # Derive Ephemeral Key
        result,status_code,key_data = self.derive_key(ac_info.hsm_id,tkt[key_id]['id'],tkt[key_id]['type'],iv_data)
        # If ephemeral key derivation fails, return the associated error code to the client handler for logging.
        if(result == False):
            del ac_info
            return result, status_code,b""
        # If the ephemeral key was derived properly, decrypt the data using software libcrypto GCM functionality exposed by libcsservernative.
        status_code,output_data = self.appctx.csn.decrypt_data(input_data,key_data,aad_data)
        # If the specified operation failed, return no resultant data and the error code with an overall operation result of False
        # to the client handler for logging.
        if(status_code != CS_OK):
            del ac_info
            return False, status_code,b""
        # The Operation Completed Successfully - return the resultant ciphertext/plaintext and a status code of CS_OK (0), and True.
        return True,status_code,output_data
```

Table B includes the definition of an exemplary function "get_random." The function get_random may be configured, inter alia, to generate a defined number of random bits with a high level of entropy. This function may be called by the crypt_data function to generate an IV.

TABLE B

```
# PKCS11-based entropy generation.
def get_random(self,session_info,num_bytes):
# Account information structure helper to more easily access user information (e.g. token label).
ac_info = AccountInfo(session_info['account_id'],session_info)
# RAND MAX LIMIT CHECK - Return an error (CS_ERR_MAX_RAND) if requested number of bytes exceeds service set limit from global configuration database entry.
if(num_bytes > self.appctx.config.get_limits_info( )['rand_max']):
    del ac_info
    return False,CS_ERR_MAX_RAND,b""
# PKCS11 Native Library call to retrieve num_bytes of entropy.
result,status_code,rand_data = self.appctx.hsm.token_get_random(ac_info.hsm_id,num_bytes)
# If PKCS11 Native Library call fails, return the associated error code to the client handler for logging.
# Otherwise, return the status code of CS_OK (0) and the randomly generated data.
if(status_code != CS_OK):
    return False,status_code,b""
return True,CS_OK,rand_data
```

Table C includes the definition of an exemplary function "derive_key." The function derive_key may be configured, inter alia, to derive a key based on an IV and a master key identifier. This function may be called by the crypt_data function to derive an ephemeral key. The crypt_data function may call derive_key for both encryption and decryption operations.

TABLE C

```
# Symmetric Key Derivation via Libcrypto and PKCS11.
def derive_key(self,token_label,dkey_id,dkey_type,seed_data):
    # Transform seed data into a 256 bit value via SHAKE256 XOF exposed by libcsservernative (libcrypto/openssl wrapper).
    status_code,digest = self.appctx.csn.digest_data(caas.csn.ALGORITHM_SHAKE256,seed_data)
    # If digest operation fails, return the associated error.
    if(status_code != CS_OK):
        return False, status_code,b""
    # Query the HSM Partition via label to find a symmetric key object via its CKA_ID value retrieved from user profile database entry.
    # Operation is performed via PKCS11 native library call.
    status_code,h_key = self.appctx.hsm.token_find_object_by_id(token_label,dkey_id)
    if(status_code != CS_OK):
        return False,status_code,b""
    # From the respective key profile list, retrieve the PKCS11 signature mechanism for our symmetric key.
    sig_mech = self.appctx.key_profiles[dkey_type].mech_sig
    # Perform a symmetric signature (specifically HMAC256) via the signature mechanism and user-specific symmetric key handle.
```

TABLE C-continued

```
# This operation is performed via PKCS11 native library call.
    status_code,sig_data =
self.appctx.hsm.token_sign(token_label,h_key,sig_mech,digest)
    # If PKCS11 Native Library call fails, return the associated error
code to the client handler for logging.
    # Otherwise, return the status code of CS_OK (0) and the ephemeral
key (sig_data).
        if(status_code != CS_OK):
            return False, status code,b""
        return True,status code,sig_data
```

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may be included in a transfer event or an escape event. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server may not need to stream the data to the computer system. This may be beneficial for the computer system, because the retrieval may be faster than data-streaming. Conventionally, streaming data requires heavy usage of the processor and the cache memory. If the data is stored in the computer system's memory, retrieval of the data may not require heavy processor and cache memory usage. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to generating, managing, and/or operating cryptographic keys. The various tasks may be related to encrypting, decrypting, and/or securing digital datasets.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
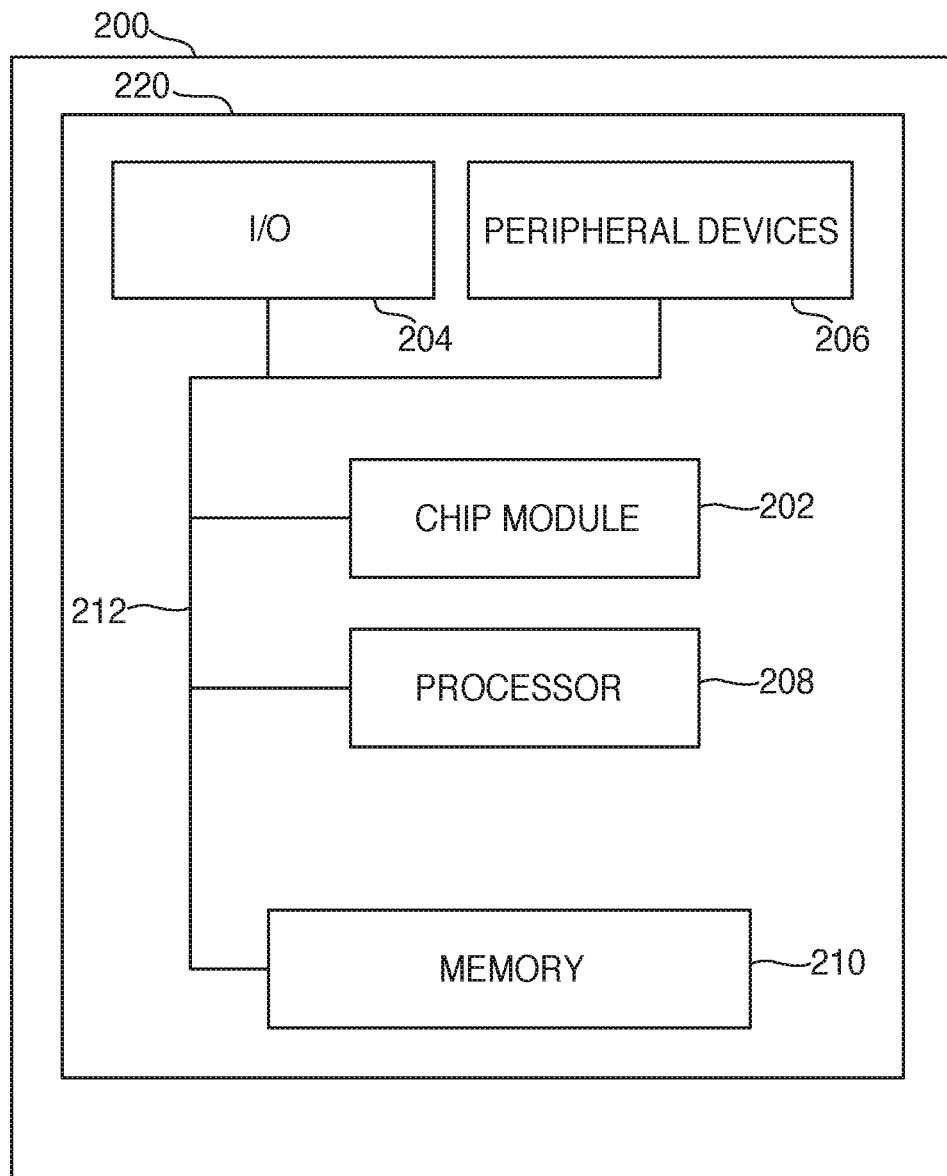
FIG. 2 shows an illustrative apparatus in accordance with principles of the disclosure.

FIG. 2 shows illustrative apparatus 200 that may be configured in accordance with the principles of the disclosure. Elements of apparatus 200 may be used to implement various aspects of the systems and methods disclosed herein.

Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
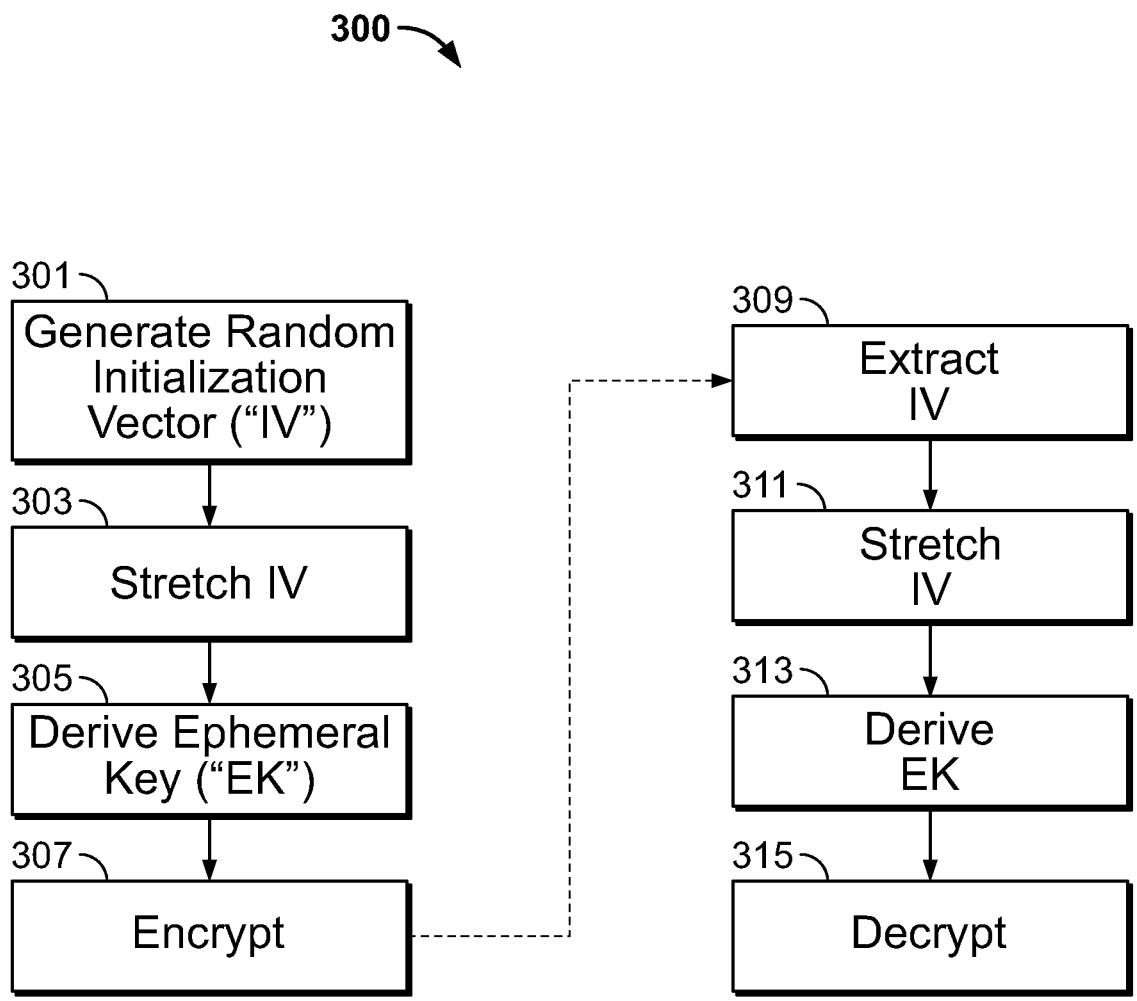
FIG. 3 shows an illustrative flowchart in accordance with principles of the disclosure.

FIG. 3 shows illustrative flowchart 300. Flowchart 300 shows exemplary high-level steps that may be included in systems and methods for securing data in accordance with aspects of the disclosure. The steps are shown as two tracks. The first track includes steps 301-307, and the second track includes steps 309-315.

The first track, steps 301-307 of flowchart 300, may be part of a process to encrypt a dataset. The process may begin with step 301, generate a random IV. The IV may be stretched at step 303 to produce a stretched IV. Stretching the IV may involve an extendable output function. The stretched IV may be used, along with a master key, to derive an ephemeral key at step 305. The ephemeral key may be used, along with the IV, to encrypt the data at step 307. Encrypting the data may produce a ciphertext. In some embodiments, the IV may be appended or otherwise linked to the ciphertext. The ciphertext may be stored, transmitted, or otherwise used without the ephemeral key. The ephemeral key may subsequently be inaccessible, destroyed, or otherwise nonexistent.

The second track, steps 309-315, may show the process by which the ephemeral key may be rederived to decrypt the ciphertext. Step 309 of the second track may follow the encryption of step 307, wherein a ciphertext was produced and linked with the IV. Step 309 includes extracting the IV. Extracting the IV may, in some embodiments, include taking the first 96 bits of the ciphertext. Step 311 includes stretching the IV to produce a stretched IV. The stretched IV may be used, along with a master key, to derive an ephemeral key at step 313. The ephemeral key may be used, along with the IV, to decrypt the data at step 315. Decrypting the data may reproduce the original plaintext of the dataset.

Figure 4:
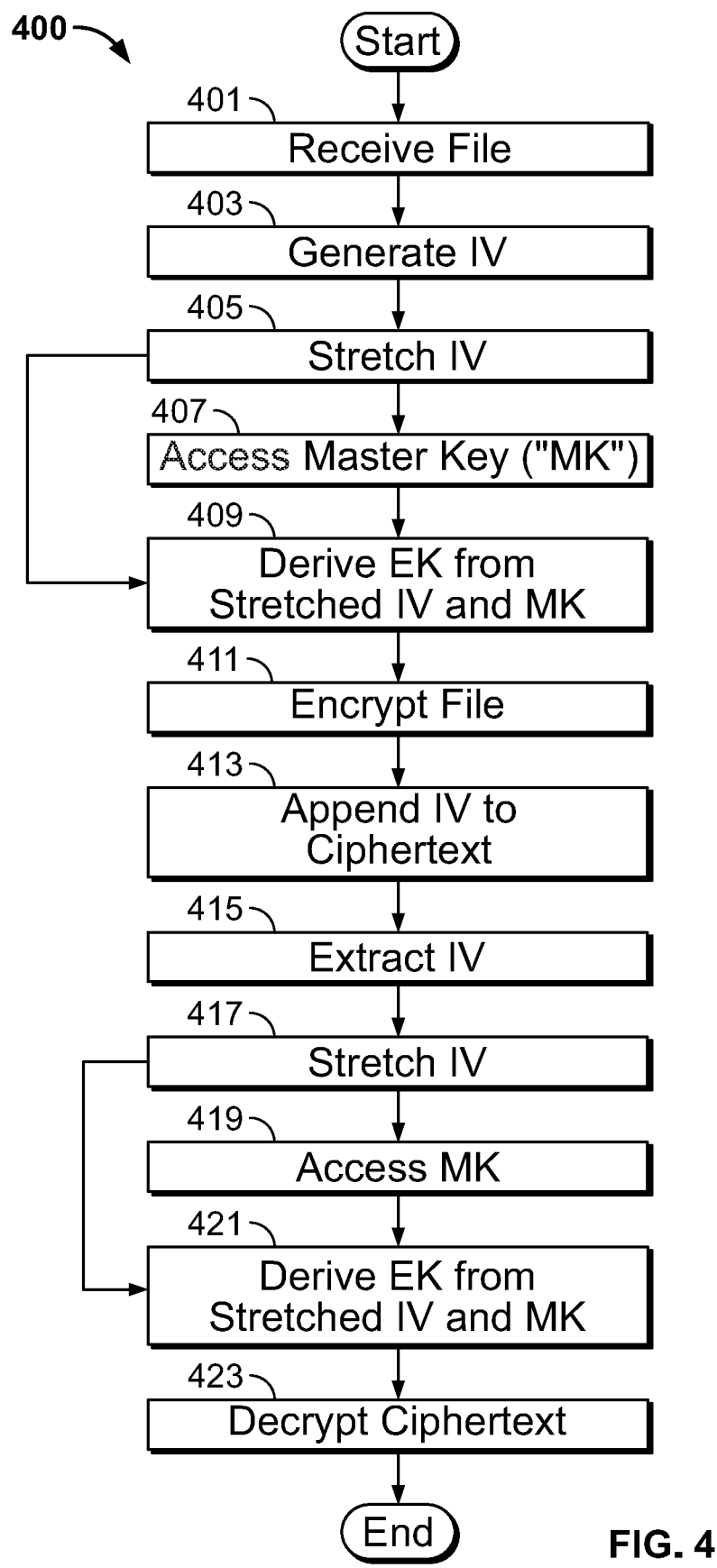
FIG. 4 shows another illustrative flowchart in accordance with principles of the disclosure.

FIG. 4 shows illustrative flowchart 400 in accordance with aspects of the disclosure. Flowchart 400 shows an exemplary logical flow that may be included in systems and methods for securing data.

A dataset (e.g., a file) is received at step 401. At step 403, an IV is generated. The IV is stretched at step 405. A master key is accessed at step 407. The stretched IV produced in step 405, and the master key accessed at step 407, may be used in step 409 to derive an ephemeral key. The ephemeral key may be used in step 411 to encrypt the file, creating a ciphertext. The IV may be linked to the ciphertext at step 413. Linking the IV may involve a reference (e.g., a pointer), or, preferably, the linking may involve appending the IV directly to the ciphertext. Appending the IV may include prepending the bit string of the IV to the beginning of the bit string of the ciphertext.

Step 415 may begin the reverse process of decrypting the ciphertext. Step 415 includes extracting the IV. Extracting the IV may include removing or otherwise taking a number of bits—corresponding to the size of the IV—from the beginning of the ciphertext. The IV may be stretched at step 417 to produce a stretched IV. The master key may be accessed at step 419. Accessing the master key may include selecting the master key from a set of master keys. Each master key may be mapped to a set of datasets. The mapping may be dependent upon version (e.g., more recent datasets may have been encrypted with an updated version of a master key) or any other suitable condition. Selecting the master key may include using an associated identifier.

The stretched IV produced at step 417 and the master key accessed at step 419 may be used, at step 421, to rederive the ephemeral key. The ephemeral key may be used, along with the IV, to decrypt the ciphertext at step 423 and reproduce the plaintext of the file.

Figure 5:
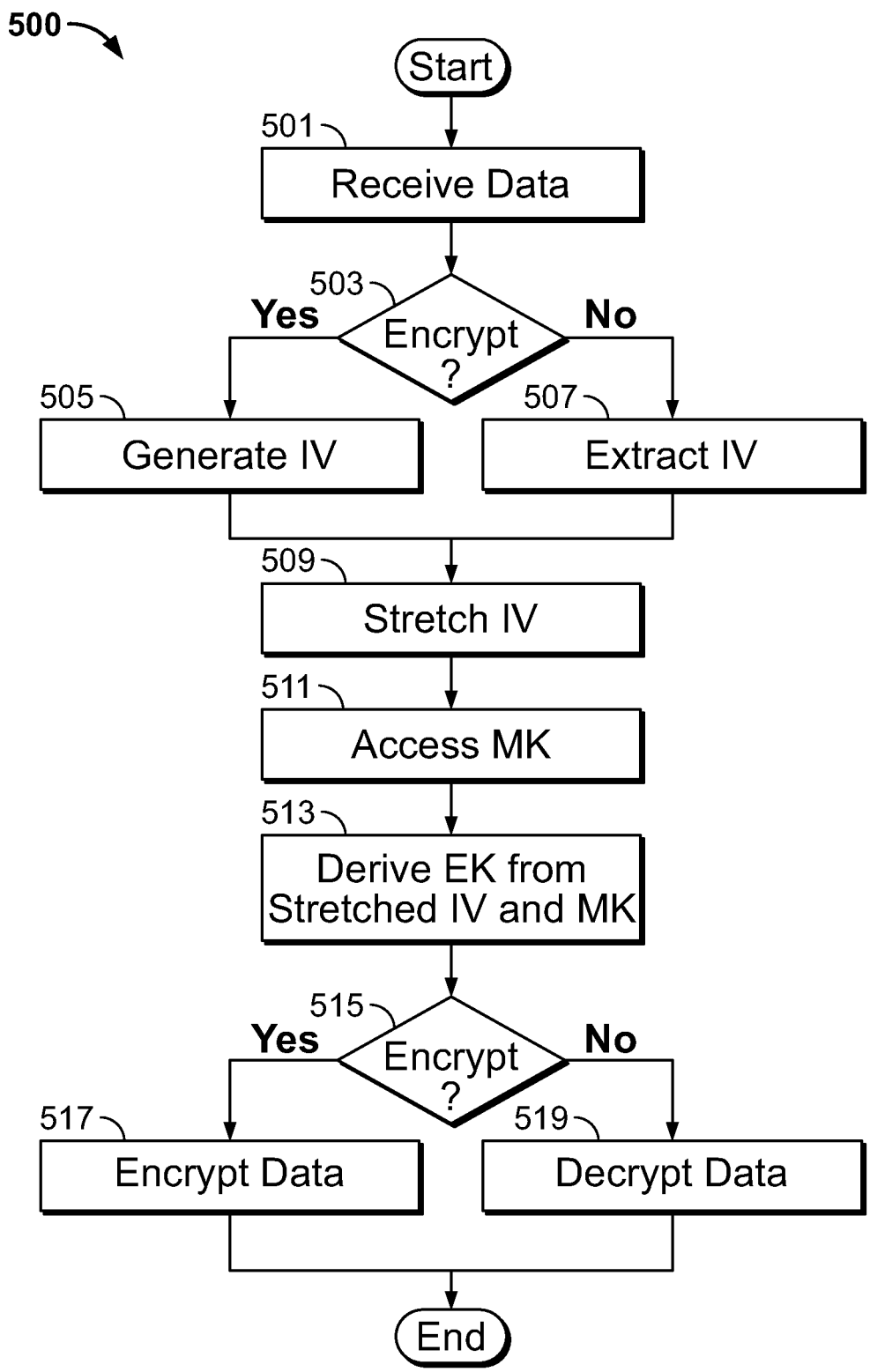
FIG. 5 shows yet another illustrative flowchart in accordance with principles of the disclosure.

Both the encryption and decryption processes illustrated in FIGS. 3 and 4 may, in certain embodiments, be implemented in a single encrypt/decrypt computer code function. (See, e.g., Table A above.) The encrypt/decrypt function may be called with a parameter that indicates whether it is being called to encrypt or decrypt. Flowchart 500 shown in FIG. 5 shows the logical flow of an exemplary encrypt/decrypt function that may be configured to both encrypt and decrypt data in accordance with aspects of the disclosure.

At step 501, data is received. Step 503 determines whether the data is to be encrypted or decrypted. The determination of step 503 may, in certain embodiments, depend on a function parameter, e.g., an "encrypt" parameter that can be set to true or false. If step 503 determines that data is to be encrypted, an IV may be generated at step 505. Generating the IV may, in certain embodiments, involve a call to a separate function. (See, e.g., Table B above.) If step 503 determines that is data is to be decrypted, the IV may be extracted from the data at step 507.

Steps 505 and 507 both feed into step 509, stretch the IV. A master key may be accessed at step 511. At step 513, an ephemeral key may be derived based on the stretched IV and the master key. In some embodiments, steps 509-513 may be implemented by a separate function (see, e.g., Table C above) that is called by the main encrypt/decrypt function. The encrypt/decrypt function may, if an encrypt operation is determined (at step 515), encrypt the data at step 517, and, if a decrypt operation is determined (at step 515), decrypt the data at step 519. Steps 517 and 519 may include function calls to a cryptographic library. The resultant ciphertext or plaintext may, in some embodiments, be returned to a client application.

Figure 6:
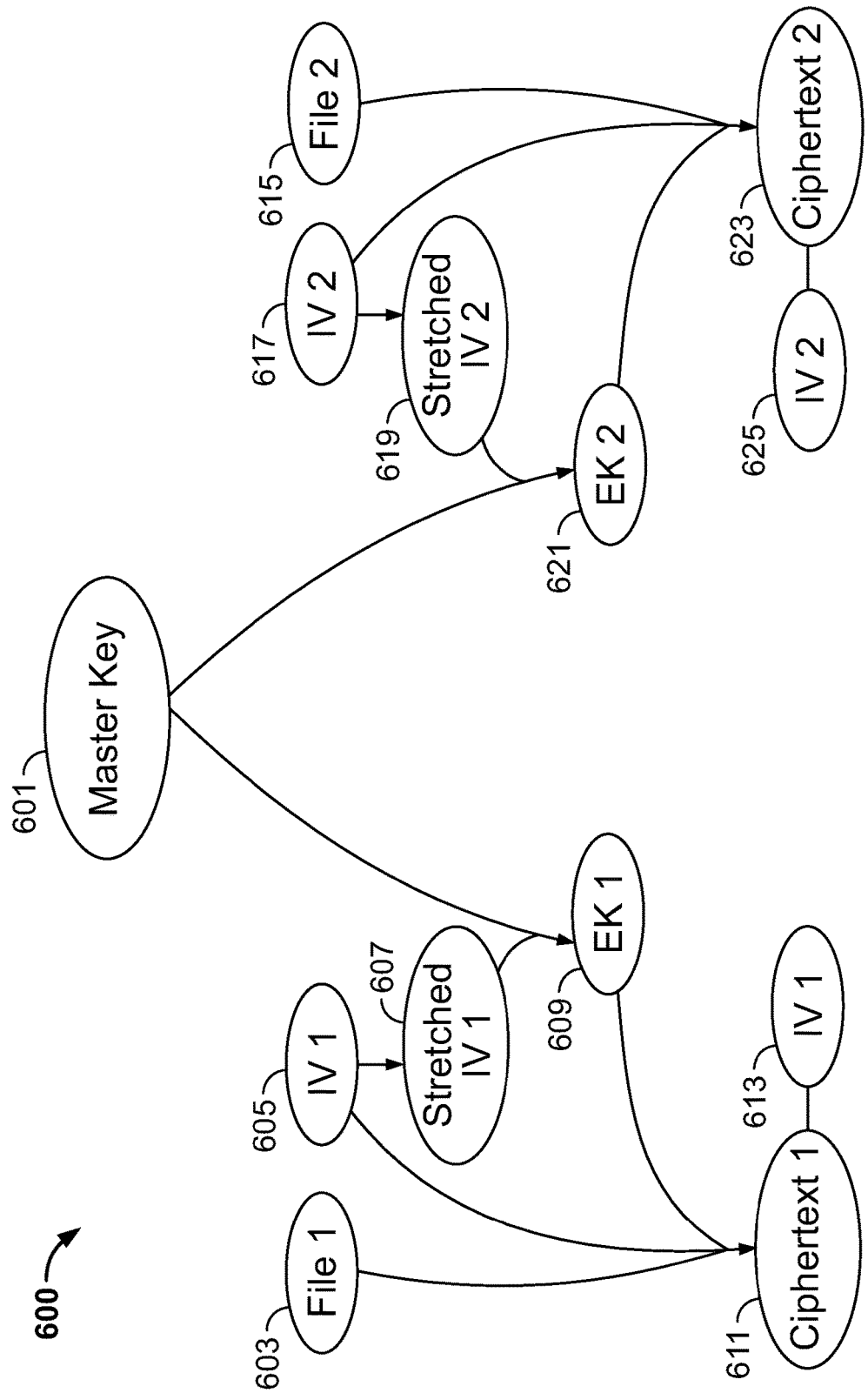
FIG. 6 shows an illustrative diagram in accordance with principles of the disclosure.

FIG. 6 shows an illustrative diagram of architecture 600. Architecture 600 may show elements of a system for encrypting a set of files in accordance with aspects of the disclosure. Arrows between elements in architecture 600 show relationships based on derivation, i.e., an arrow extending from a first element to a second, shows that the second element is derived, at least in part, from the first element.

Element 601 represents a master key. The master key may be accessible to, and usable with, more than one file in the system. The system may include a large number of files, and architecture 600 shows two files for illustrative purposes. Element 603 represents File 1, and element 615 represents File 2. Element 605 represents IV 1 generated for File 1. Element 607, stretched IV 1, may be derived based on IV 1. Element 609, Ephemeral Key 1, may be derived based on the master key and stretched IV 1. Element 611 shows Ciphertext 1, which may be derived based on Ephemeral Key 1, IV 1, and the plaintext of File 1. Ciphertext 1 may be linked to element 613, IV 1 (same as element 605).

Similarly, element 617 represents IV 2 generated for File 2. Element 619, stretched IV 2, may be derived based on IV 2. Element 621, Ephemeral Key 2, may be derived based on the master key and stretched IV 2. Element 623 shows Ciphertext 2, which may be derived based on Ephemeral Key 2, IV 2, and the plaintext of File 2. Ciphertext 2 may be linked to element 625, IV 2 (same as element 617).

Figure 7:
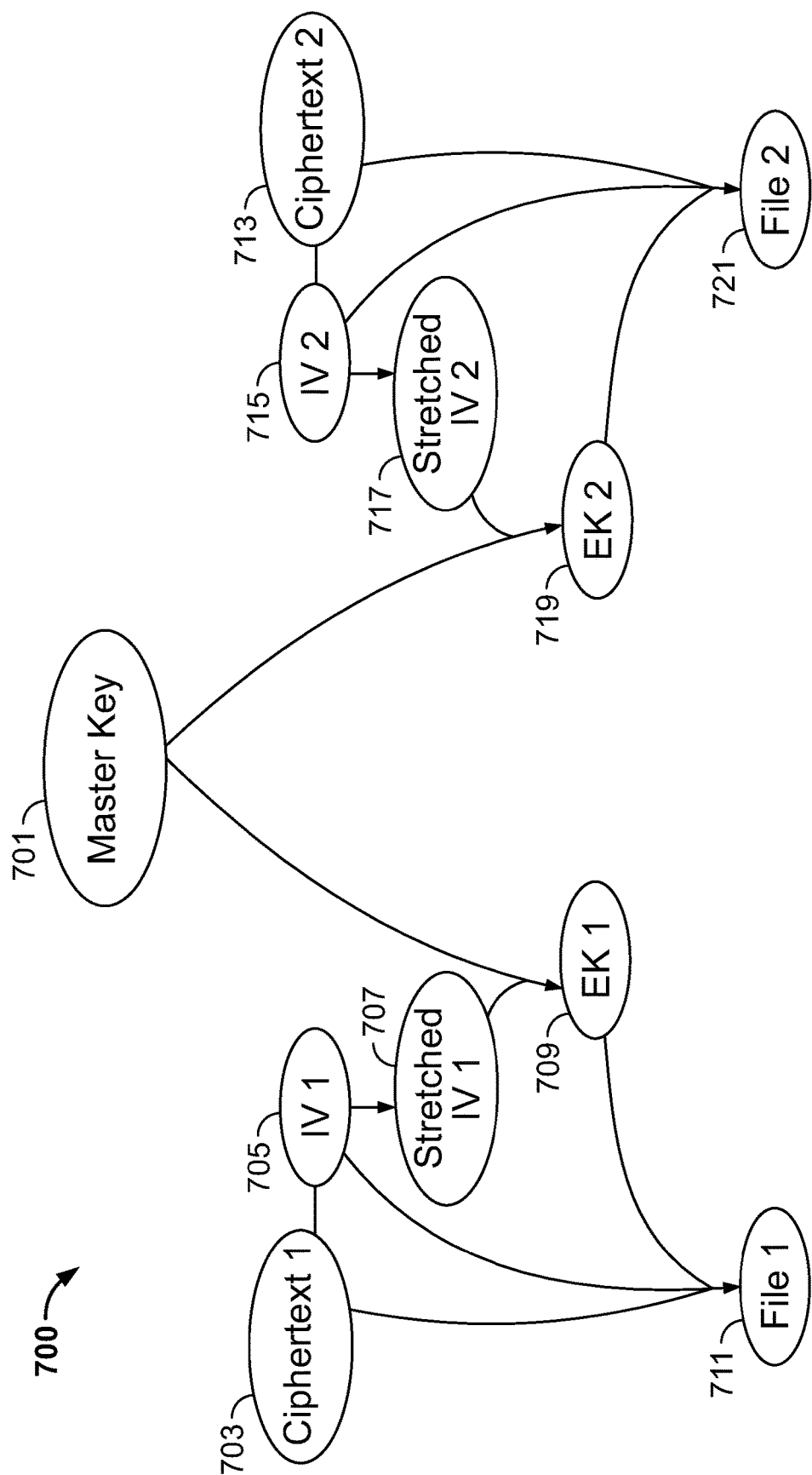
FIG. 7 shows another illustrative diagram in accordance with principles of the disclosure.

FIG. 7 shows an illustrative diagram of architecture 700. Architecture 700 may show elements of a system for decrypting a set of encrypted files in accordance with aspects of the disclosure. The encrypted files may have been encrypted using the system shown in FIG. 6. Arrows between elements in architecture 700 show relationships based on derivation, i.e., an arrow extending from a first element to a second, shows that the second element is derived, at least in part, from the first element.

Element 701 represents a master key. When architecture 600 was used to encrypt the files, element 701 may be the same master key as element 601 shown in architecture 600. The master key may be accessible to, and usable with, more than one encrypted file in the system. The system may include a large number of encrypted files, and architecture 700 shows two files for illustrative purposes. Element 703 represents one encrypted file, Ciphertext 1, and element 713 represents a second encrypted file, Ciphertext 2. Element 705 represents IV 1 that is linked to Ciphertext 1. Element 707, stretched IV 1, may be derived based on IV 1. Element 709, Ephemeral Key 1, may be derived based on the master key and stretched IV 1. Element 711 shows File 1, which may be the plaintext derived based on Ephemeral Key 1, IV 1, and Ciphertext 1.

Similarly, element 715 represents IV 2 that is linked to Ciphertext 2. Element 717, stretched IV 2, may be derived based on IV 2. Element 719, Ephemeral Key 2, may be derived based on the master key and stretched IV 2. Element 721 shows File 2, which may be the plaintext derived based on Ephemeral Key 2, IV 2, and Ciphertext 2.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a digital cryptosystem with re-derivable hybrid keys are provided. Persons skilled in the art will appreciate that the present invention can be practiced by other than the described embodiments, which are presented for purposes of illustration rather than of limitation, and that the present invention is limited only by the claims that follow.

What is claimed is:

1. A hybrid cryptographic system for securing a set of one or more datasets, said system comprising computer executable instructions stored in a non-transitory memory that, when run on a processor, are configured to:
   generate a master key, said master key for use with all of the one or more datasets; and
   for each of the one or more datasets:
   generate a separate initialization vector ("IV");
   stretch the IV via an extendable output function ("XOF") to produce a stretched IV, wherein said XOF is a function that, given an input, produces a consistent output of a predetermined length;
   input the stretched IV and the master key to a keyed hash function to derive an ephemeral key; and
   encrypt the dataset by inputting the IV, the dataset, and the ephemeral key to a cryptographic function to produce a ciphertext.

2. The system of claim 1, wherein the computer executable instructions are further configured to:
- link the IV with the ciphertext by appending the IV to the ciphertext to create a combined text; and
- store and/or transmit the combined text without the ephemeral key;
- wherein, to decrypt the ciphertext, the computer executable instructions are configured to:
- extract the IV and the ciphertext from the combined text;
- re-produce the stretched IV by inputting the IV to the XOF;
- re-derive the ephemeral key via the keyed hash function using the stretched IV and the master key; and
- decrypt the ciphertext by inputting the IV, the ciphertext, and the ephemeral key to the cryptographic function to reproduce the dataset in plaintext.

3. The system of claim 1, wherein: the IV is a string of either 96 or 128 bits;
- the master key is a string of 256 bits; and
- the computer executable instructions are further configured to stretch the IV by producing, based on the IV and via the XOF, a string of 256 bits for use as the stretched IV.

4. The system of claim 1, wherein the cryptographic function satisfies the Advanced Encryption Standard ("AES") cryptographic standard specified in Federal Information Processing Standards Publication 197 ("FIPS PUB 197").

5. The system of claim 1, wherein the XOF satisfies the Secure Hash Algorithm-3 ("SHA-3") standard specified in Federal Information Processing Standards Publication 202 ("FIPS PUB 202").

6. The system of claim 1, wherein the keyed hash function satisfies the Keyed-Hash Message Authentication Code ("HMAC") standard specified in Federal Information Processing Standards Publication 198-1 ("FIPS PUB 198-1").

7. The system of claim 1, wherein the computer executable instructions are further configured to input the IV to the cryptographic function to encrypt the dataset using a mode of operation defined by the National Institute of Standards and Technology ("NIST") in the NIST Special Publications 800-38A through 800-38E.

8. A method for generating an ephemeral key and using the ephemeral key to secure a dataset, said ephemeral key being a digital cryptographic key that is derived to encrypt the dataset, and is rederive-able on demand to decrypt the dataset without the ephemeral key being stored after the encrypting, the method executed by computer code stored in a non-transitory memory running on a hardware processor, the method comprising:
- generating a random initialization vector ("IV");
- stretching the IV to produce a stretched IV;
- deriving the ephemeral key based on the stretched IV and a master key, said master key being a global cryptographic key that is stored in a secure memory and is shared by other datasets; and
- encrypting the dataset using the IV and the ephemeral key to produce a ciphertext; wherein the ciphertext is decrypted by:
- re-stretching the IV to re-produce the stretched IV;
- re-deriving the ephemeral key based on the re-produced stretched IV and the master key; and
- decrypting the ciphertext using the IV and the ephemeral key.

9. The method of claim 8, wherein: the dataset is a member of a set of datasets; and
- the method is executed for each dataset in the set of datasets, wherein the method comprises deriving a separate IV for each dataset in the set of datasets.

10. The method of claim 8, wherein:
- the stretching comprises inputting the IV to an extendable output function ("XOF") and receiving the stretched IV as output from the XOF, wherein said XOF is a one-way function that, given an input, generates a consistent output of a predetermined length;
- the deriving comprises inputting the stretched IV and the master key to a keyed hash function and receiving the ephemeral key as output; and
- the encrypting comprises inputting the IV, the dataset, and the ephemeral key to a cryptographic function to produce the ciphertext.

11. The method of claim 10, wherein:
- the XOF satisfies the Secure Hash Algorithm-3 ("SHA-3") standard specified in Federal Information Processing Standards Publication 202 ("FIPS PUB 202"); the keyed hash function satisfies the Keyed-Hash Message Authentication Code ("HMAC") standard specified in Federal Information Processing Standards Publication 198-1 ("FIPS PUB 198-1");
- the cryptographic function satisfies the Advanced Encryption Standard ("AES") cryptographic standard specified in Federal Information Processing Standards Publication 197 ("FIPS PUB 197"); and/or
- the inputting the IV to the cryptographic function in the encrypting the dataset and decrypting the ciphertext comprises using a mode of operation defined by the National Institute of Standards and Technology ("NIST") in the NIST Special Publications 800-38A through 800-38E.

12. The method of claim 8, wherein:
- the IV is a string of either 96 or 128 bits; the master key is a string of 256 bits; and the stretching comprises producing, based on the IV, a string of 256 bits for use as the stretched IV.

13. The method of claim 8, further comprising:
- appending the IV to the ciphertext to create a combined text; and storing and/or transmitting the combined text independent of the ephemeral key.

* * * * *